(12) United States Patent
Tame

(10) Patent No.: US 6,231,123 B1
(45) Date of Patent: May 15, 2001

(54) VEHICLE SEAT WITH LINEAR RECLINING MECHANISM AND AN EASY ENTRY LATCH WITH MEMORY

(75) Inventor: Omar D. Tame, West Bloomfield, MI (US)

(73) Assignee: Magna Lomason, Inc., Aurora (CA)

( * ) Notice: Subject to any disclaimer, the term of this patent is extended or adjusted under 35 U.S.C. 154(b) by 0 days.

(21) Appl. No.: 09/248,478

(22) Filed: Feb. 11, 1999

Related U.S. Application Data
(60) Provisional application No. 60/074,300, filed on Feb. 11, 1998.

(51) Int. Cl.[7] ............................................. B60N 2/02
(52) U.S. Cl. ................. 297/378.1; 297/375; 297/378.12
(58) Field of Search ........................... 297/378.1, 378.12, 297/375, 362.14, 341, 344.1

(56) References Cited

U.S. PATENT DOCUMENTS

| | | | |
|---|---|---|---|
| 4,822,101 | * | 4/1989 | Hosoe ............................ 297/378.12 |
| 4,844,542 | * | 7/1989 | Humer ......................... 297/378.12 X |
| 4,881,774 | | 11/1989 | Bradley et al. ...................... 297/341 |
| 5,286,076 | | 2/1994 | DeVoss et al. . | 
| 5,707,112 | | 1/1998 | Zinn . |
| 5,741,000 | | 4/1998 | Goodbred . |
| 5,823,622 | * | 10/1998 | Fisher, IV et al. ............... 297/375 X |
| 5,918,939 | * | 7/1999 | Magadanz ...................... 297/378.12 |

FOREIGN PATENT DOCUMENTS

| | | |
|---|---|---|
| 0451035 | 10/1991 | (EP) . |
| 1498801 | 9/1967 | (FR) . |
| WO9742051 | 11/1997 | (WO) . |

* cited by examiner

Primary Examiner—Laurie K. Cranmer
(74) Attorney, Agent, or Firm—Howard & Howard

(57) ABSTRACT

A seat assembly for use in an automotive vehicle includes a seat track assembly for securing the seat in the vehicle. A seat cushion is supported by the seat track assembly and a seat back is pivotally secured to the seat track assembly and pivotal between one of a plurality of reclining positions and a forward dumping position. A linear actuator selectively adjusts the seat back between the plurality of reclining positions. A locking member intercoupled between the linear actuator and the seat back operatively locks the seat back in one of the plurality of reclining positions and a seat back releasing member is coupled to the locking member for releasing the locking member from the seat back and allowing the seat back to pivot from the reclining position to the dumping position while the linear actuator retains the previously adjusted reclining position of the seat back. A track locking member selectively locks the seat track assembly and seat in one of a plurality of fore and aft seat adjustment positions. A transmission member interconnects the seat back and the track locking member for automatically unlocking the seat track in response to pivotal movement of the seat back from the reclining position to the dumping position to allow access to the area behind the seat.

24 Claims, 9 Drawing Sheets

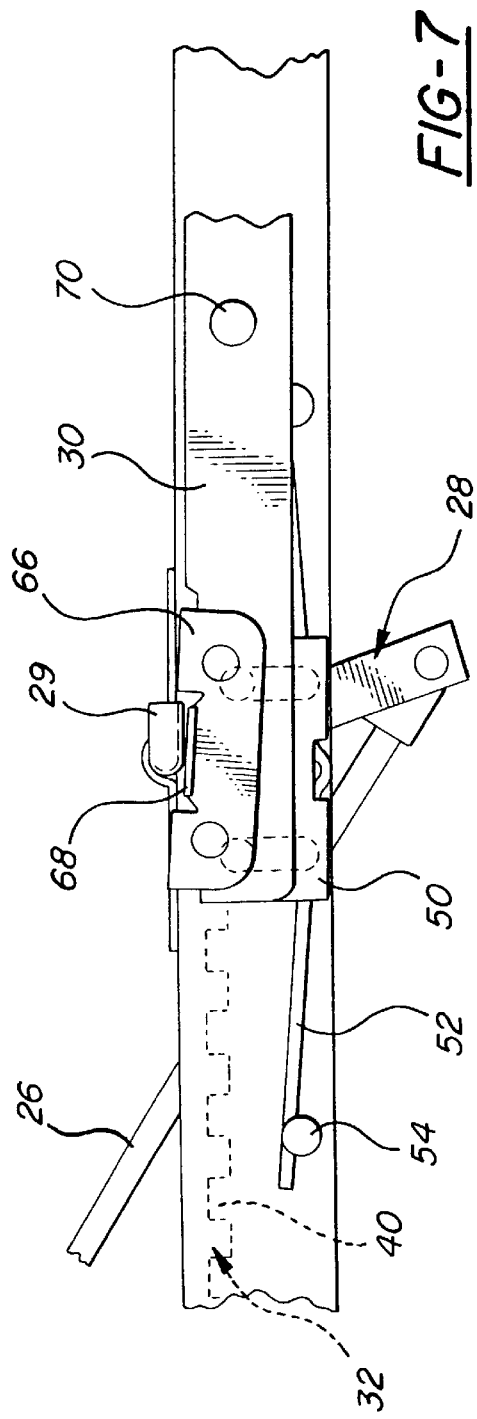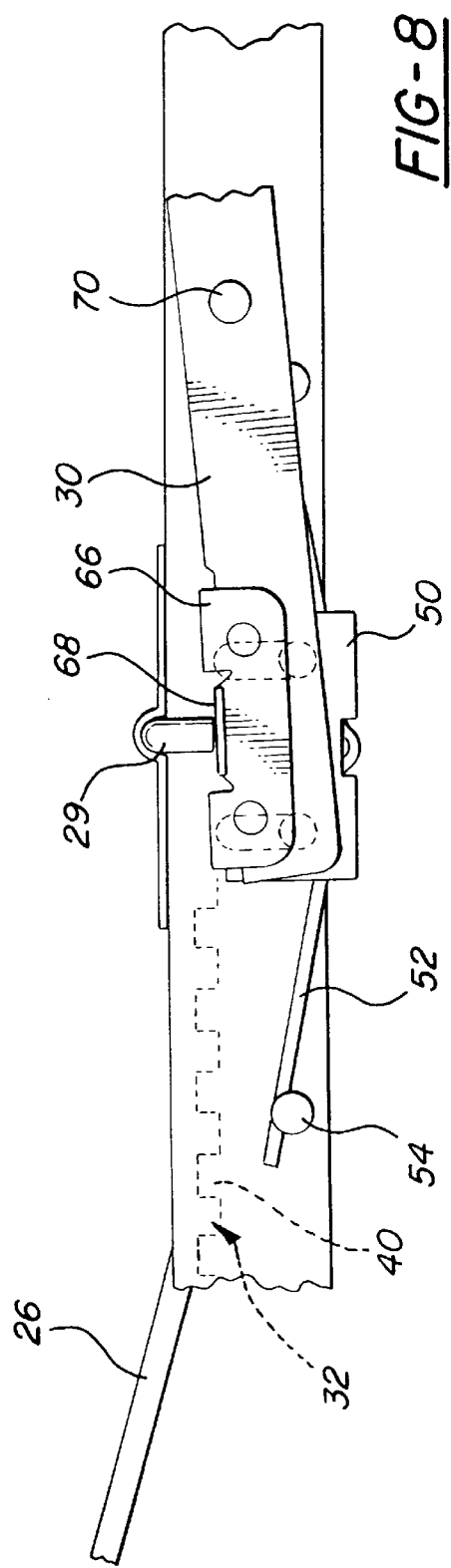

VEHICLE SEAT WITH LINEAR RECLINING MECHANISM AND AN EASY ENTRY LATCH WITH MEMORY

RELATED APPLICATION

This application claims priority to and all the benefits of U.S. Provisional Application No. 60/074,300, filed on Feb. 11, 1998 and entitled "Vehicle Seat with a Linear Reclining Mechanism and an Easy Entry Latch with Memory".

TECHNICAL FIELD

The subject invention relates to a vehicle seat assembly having a linear seat back recliner and an easy entry latch mechanism with memory feature of the seat back recliner position.

BACKGROUND OF THE INVENTION

Vehicle seat assemblies commonly includes a seat track assembly for slidably mounting the seat to the floor of the vehicle. A seat cushion is supported by the seat track assembly and a seat back is pivotally supported by the seat cushion or seat track assembly. It is often desirable to adjust the angular or reclining position of the seat back with respect to the seat cushion for user comfort and safety. It is also often desirable to pivot the seat back fully forward, to a dumped position to allow easier access to the area behind the seat assembly. However, once the seat back has been pivoted fully forward to the dumped position, the previously adjusted reclining position is lost and the seat back must again be adjusted to the desired seat back reclining position.

Further, the seat track assembly is often unlocked or released when the seat back is pivoted to the dumped position allow forward sliding movement of the entire seat assembly and provide even greater access to the area behind the seat assembly. The release of both the seat back and seat track causes even further difficulty in retaining the previously adjusted reclining position of the seat back upon return from the dumped position.

Therefore, it remains desirable to provide a mechanism which allow release of the seat back for pivotal movement from the adjusted reclining position to the dumped position, while retaining, or memorizing, the previously adjusted reclining position upon return of the seat back.

SUMMARY OF THE INVENTION

A vehicle seat assembly including a seat mounting assembly for securing the seat in a vehicle. A seat cushion is supported by the seat mounting assembly and a seat back is pivotally secured to the seat mounting assembly and pivotal between one of a plurality of reclining positions and a forward dumping position. A linear actuator selectively adjusts the seat back between the plurality of reclining positions. A locking member intercoupled between the linear actuator and the seat back operatively locks the seat back in one of the plurality of reclining positions and a seat back releasing member is coupled to the locking member for releasing the locking member from the seat back and allowing the seat back to pivot from the reclining position to the dumping position while the linear actuator retains the previously adjusted reclining position of the seat back.

BRIEF DESCRIPTION OF THE DRAWINGS

FIG. 7 is a fragmentary profile view of a track structure lock releasing mechanism for a vehicle seat with a linear reclining mechanism and an easy entry latch with memory embodying the principles of the present invention as configured in a locked position;

FIG. 8 is a view similar to FIG. 7 showing the position of the track structure lock releasing mechanism after the seat back actuating mechanism has been moved into the operative position;

DETAILED DESCRIPTION OF THE PREFERRED EMBODIMENT

Figure 1:
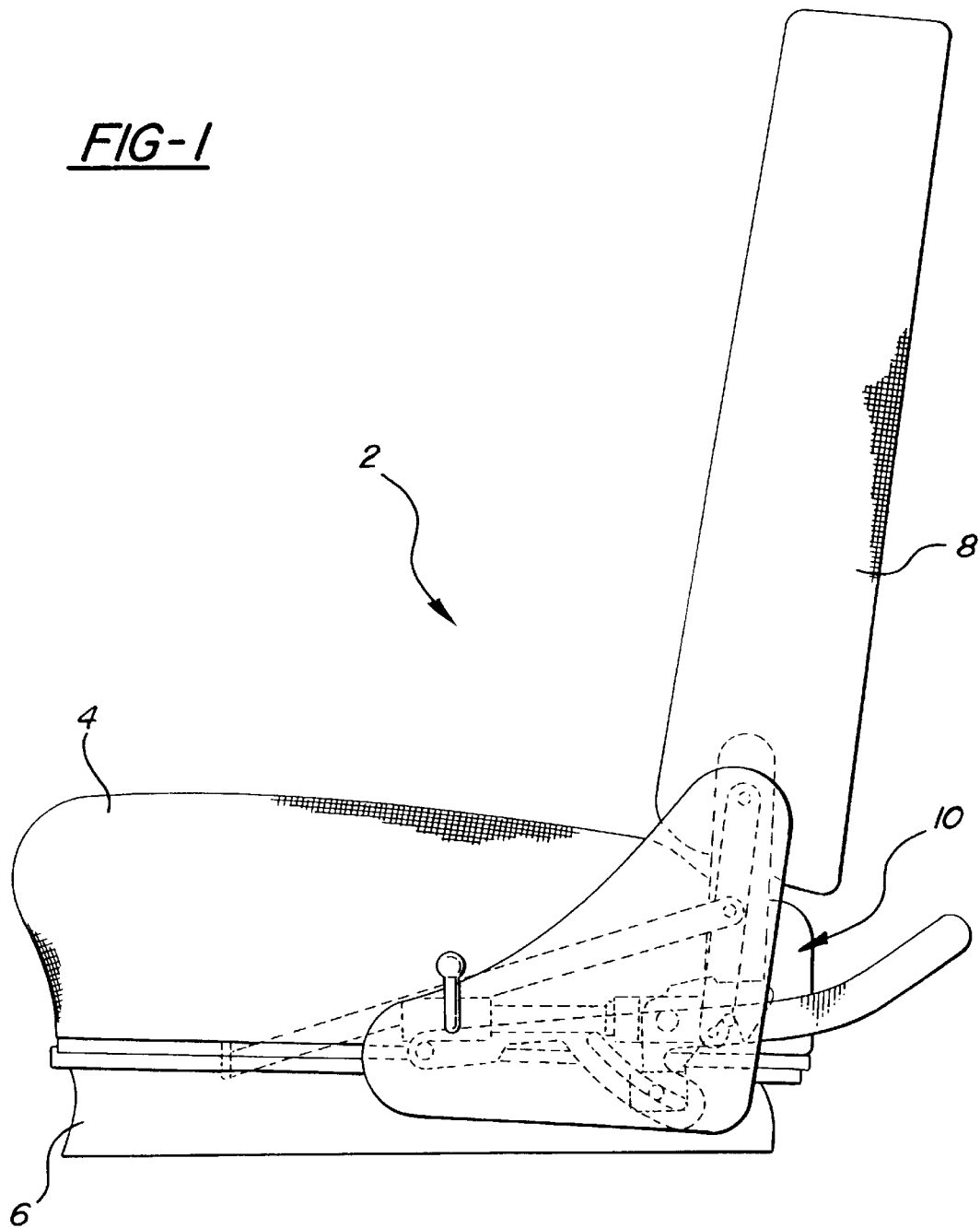
FIG. 1 is a left side elevational view of a vehicle seat with a linear reclining mechanism and an easy entry latch with memory embodying the principles of the present invention.

Referring to FIGS. 1–10, wherein like numerals indicate like or corresponding parts throughout the several views, there is shown a vehicle seat, generally indicated at 2, which includes a seat cushion assembly, generally indicated at 4, mounted on the vehicle floor for fore and aft movements by a seat mounting assembly, generally indicated at 6. The seat assembly 2 also includes a seat back cushion assembly, generally indicated at 8, mounted on the seat cushion assembly 2 for forward dumping movement, and for rearward reclining movements by a seat back mounting assembly, generally indicated at 10. Embodied within the seat back mounting assembly is an easy entry control assembly, generally indicated at 12, having a linear reclining function with memory after dumping in accordance with the principles of the present invention.

The seat cushion assembly 4 excluding the seat mounting assembly 6 may be of any well known construction which includes a rigid frame constructed and arranged to carry a seat cushion of foamed polyurethane or the like which has on its exterior a cover of suitable material. Similarly, the seat back cushion assembly 8 may be of any well known construction including a frame structure constructed and arranged to support a seat back cushion which has on its exterior a cover of suitable material. The seat mounting assembly 6 of the seat cushion assembly 4 includes two transversely spaced pairs of cooperating track assemblies, generally indicated at 14. The seat back mounting assembly 10 includes a pair of seat back support members 16 which are fixed on opposite sides of the frame structure of the seat back cushion assembly 8. Each seat back support member 16 is rotatably mounted on a seat back support base structure 18, fixedly mounted with respect to the frame of the seat cushion assembly 4.

Figure 2:
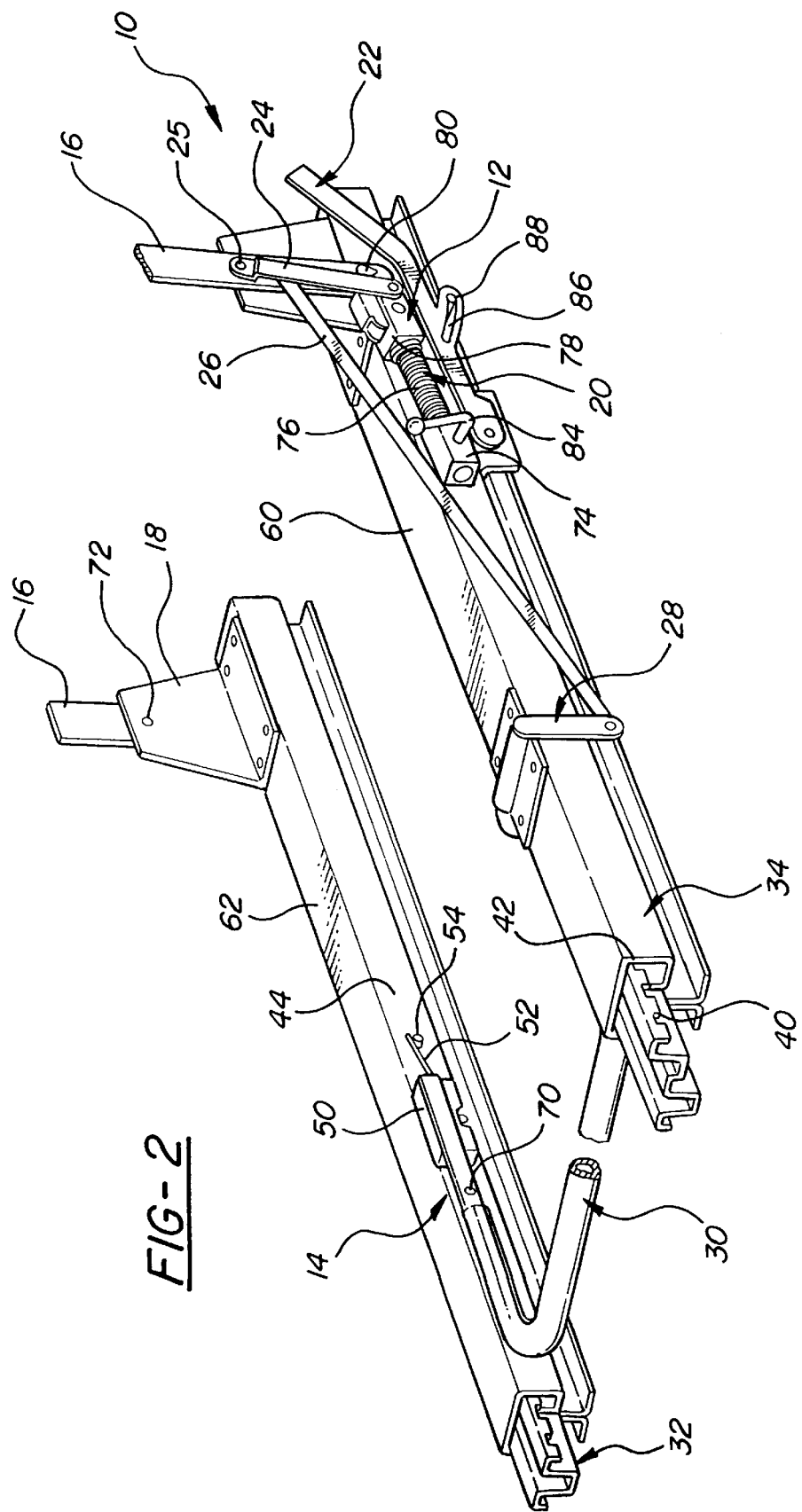
FIG. 2 is a fragmentary perspective view looking downwardly at the left side of a portion of the frame structure of a vehicle seat with a linear reclining mechanism and an easy entry latch with memory embodying the principles of the present invention as configured in the normal generally erect position.
Figure 3:
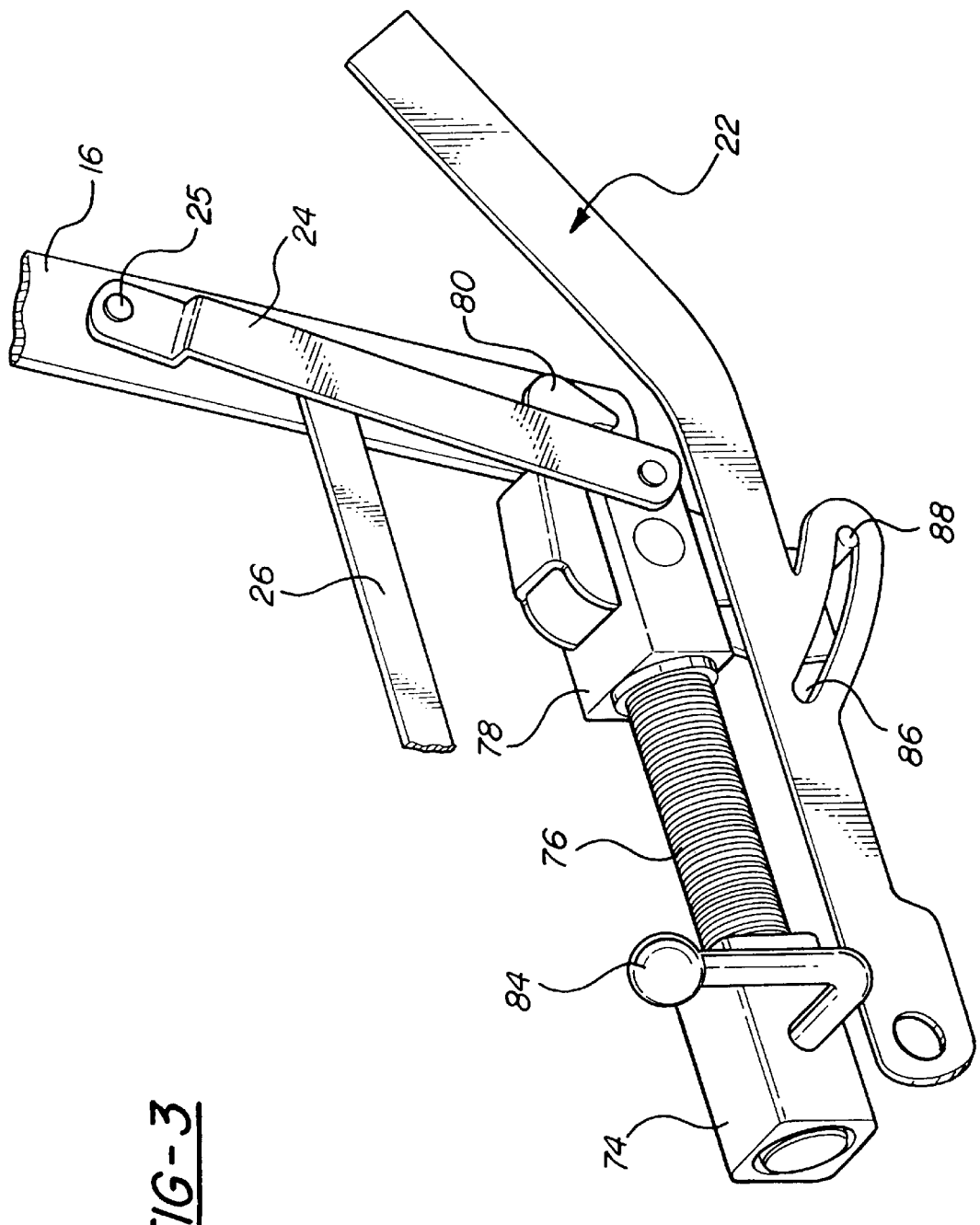
FIG. 3 is a fragmentary perspective view of the latching assembly of a vehicle seat with a linear reclining mechanism and an easy entry latch with memory shown in FIGS. 1 and 2.

As best shown in FIGS. 2–5 and 9–10, the control assembly 12 controls the pivotal movement of the seat back cushion assembly 8 with respect to the seat cushion assembly 4 provided by virtue of the pivotal connections between the seat back support members 16 and base structures 18. In order to control the reclining movements, the control assembly 12 includes a linear actuator assembly, generally indicated at 20, which is pivotally connected to one of the cooperating pairs of track assemblies 14. A seat back releasing member, generally indicated at 22, is pivotally attached to the rearward end of the linear actuator assembly 20 and engages and releases the seat back support member 16 to allow easy access and return to the same reclining position. A linear actuator assembly support structure 24 is provided for supporting the end of the linear actuator assembly 20 during easy access and return. As shown, the support structure 24 is pivoted at its upper end to the pivot pin 25, which pivotally connects the associated support member 16 and base structure 18, and at its lower end to the rearward end of the linear actuator assembly 20. An operation transmission member 26, at its most rearward end, is rotatably mounted at a position proximate to the middle portion of the support member 24. An operation linking member, generally indicated at 28, is rotatably mounted at its lower-most end to the forward end of the operation transmission member 26. The operation linking member 28 is best shown in FIGS. 2 and 6 to extend up and over the track assembly 14 to terminate at an integral rotating contact structure 29. A lock release coordinating structure, generally indicated at 30, is rotatably attached at each end respectively to one of the pairs of track assemblies 14.

The seat cushion mounting assembly 6 of the seat cushion assembly 4 may include in addition to the pairs of track assemblies 14 a spring bias to a forward-most position to facilitate access. The seat back cushion mounting assembly 10 is preferably also provided with a spring bias for the seat back cushion assembly to tend toward a generally erect position constituting the forward most position in the range of reclining positions provided.

While the preferred embodiment shown contemplates an access position of the vehicle seat 2 wherein the seat back cushion assembly 8 is pivoted forwardly into a dump position overlying the seat cushion assembly 4 and the seat cushion assembly 4 is moved forwardly from its operating position into an access position, the principles of the present invention are applicable to seats wherein the seat back cushion assembly 8 is moved forwardly into a dumping position but there is no forward movement of the seat to an access position. Moreover, while the forward access movement of the seat which is provided by the illustrated preferred embodiment does not include a memory function, the principles of the present invention are equally applicable to seats which have this memory function built on in any known manner.

The pair of track assemblies 14 as shown are constructed in accordance with the disclosures contained in U.S. Pat. Nos. 5,286,076 and 5,741,000, the disclosures of which are hereby incorporated by reference into the present specification. Each pair of track assemblies 14 includes a fixed track member 32 which is fixedly secured to the floor of the vehicle and a movable track member 34 which is fixed to the frame of the seat cushion assembly 4 so as to form a part thereof.

As best shown in FIGS. 2 and 6, each fixed track member 32 provides a pair of longitudinally aligned guide portion 38 defining a series of locking openings 40. The movable track member 34 is of a cross-sectional configuration such as to present center-facing, opposing, top-connected, C-shaped end portions 42. As best shown in FIG. 6, an inboard surface 44 of each movable track member 34, defines a locking member portal 46 disposed adjacent to the series of locking openings 40 which are presented on the guide portion 38 of the associated fixed track member 32. A track locking member, generally indicated at 48, is sized and configured to freely enter each locking member portal 46. The locking member 48 is adapted to selectably and releasably interlock with selected sections of the guide portion 38 which define the series of locking openings 40. In the fully assembled operational state, the locking member 48 is positioned within the locking member portal 46 and in vertical alignment with the guide portion 38 of the fixed track 32. A portion of the track locking member projection 48 extends outwardly through the locking member portal 46 and is integral with a spring biased plate member 50. The spring biased plate member 50 is upwardly spring biased by a spring structure 52 which is secured at each end to the inboard surface 44 of the movable track member 34 by a spring securing member 54. The outer surface of the spring biased plate member 50 defines an elongated plate member slot 56.

Proximate to each end of the lock release coordinating structure 30 is a lock coordinating projection member 58 which is adapted to fit within and serves to transmit vertical motion of the lock coordinating projection member 58 to the plate member slot 56 of the spring biased plate member 50. The plate member slot 56 is configured so as to retain but also permit limited motion of the lock coordinating projection member 58.

The two movable track assemblies 34 when referred to individually hereinafter will be referred to as a first movable track assembly 60 and a second movable track assembly 62. Fixedly attached and proximate to the end of the lock release coordinating structure 30 which is adjacent the first movable track assembly 60 is an outer plate member 66, best shown in FIGS. 6–8. A link abutment surface 68 is defined on an upper portion of the outer surface of the outer plate member 66. The lock release coordinating structure 30, proximate to each end thereof, is pivotally mounted near the center section of the inboard surface 44 of the pair of movable track assemblies 34 by a coordinating member pivot structure 70.

Figure 9:
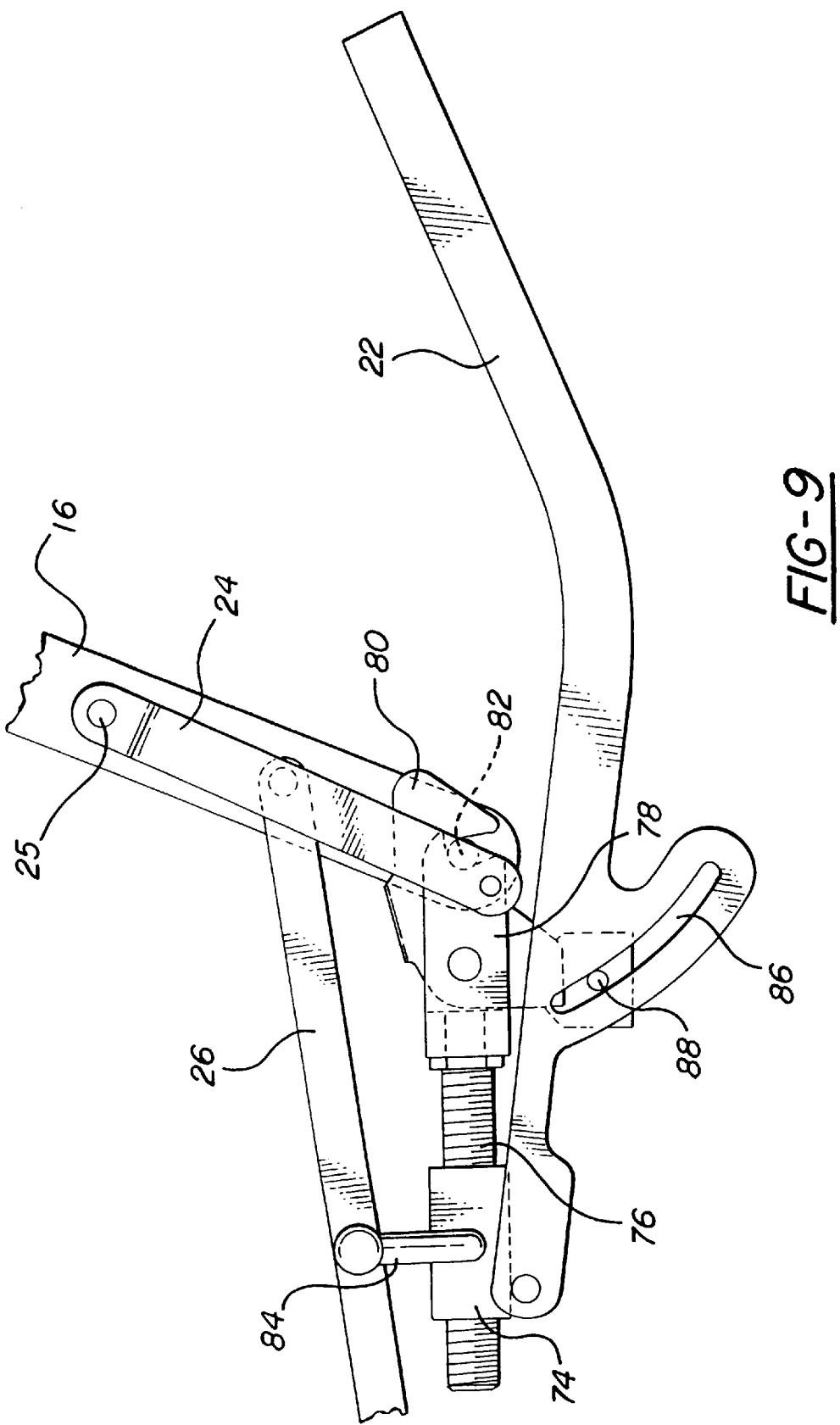
FIG. 9 is a fragmentary left profile view of the latching assembly of a vehicle seat with a linear reclining mechanism and an easy entry latch with memory embodying the principles of the present invention as configured in the generally reclined position.
Figure 10:
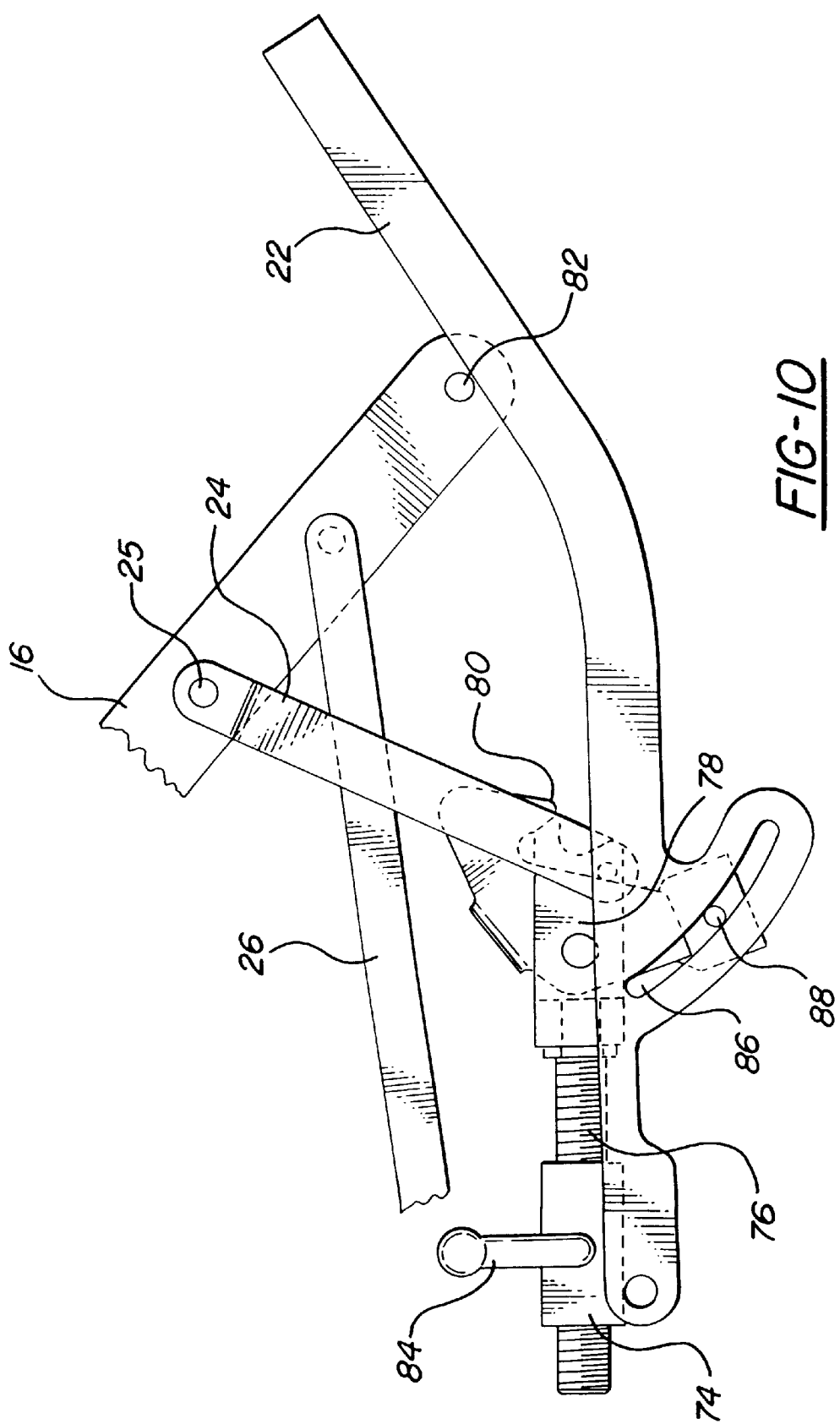
FIG. 10 is a view similar to FIG. 9 showing the position of the latching assembly components after the seat back actuating mechanism has been moved into the operative position.

The back support members 16 are each pivotally mounted to the upper portions of their respective base structures 18 by a back support pivot member 25. The control assembly 12 is mounted proximate to the base structure 18 on first movable track assembly 60. The linear actuator assembly 20 includes a linear actuator extension member locking assembly 74 which is mounted on the outboard side of the first movable track assembly 60. Passing through and extending rearwardly is a releasably attached elongated extension member 76 which terminates in an abutting structure 78. A seat back locking member 80 is pivotally mounted to the abutting structure 78 such that its uppermost portion can be selectively rotated by operation of the seat back releasing member 22 against a spring bias into (1) an open position above the abutting structure 78 as shown in FIG. 10 or (2) can be returned by action of the spring bias to a closed position rearward of the abutting structure 78 as shown in FIG. 9. The abutting structure 78 abuts against and serves to prevent forward motion of a seat back support locking pin structure 82 which is fixedly attached on the outboard surface of the lower portion of the seat back support member 16.

In operation, a linear actuator releasing member 84 when placed in an unlocked position by an operator acts on the locking assembly 74, in a manner as is well known in the art, to release the extension member 76 allowing the extension member 76 to move forward or rearward as desired by the operator. As best shown in FIGS. 4, 5, 9 and 10 the seat back support locking pin 82, being abutted against the rearward surface of the abutting structure 78 will be displaced rearward by the rearward movement of the abutting structure 78. The seat back locking member 80 being spring biased to a closed position, rearward of the abutting structure 78, is normally in a locked position against the rear surface of the seat back support locking pin structure 82. Thus, in the normal locked position of the seat back locking member 80, the seat back locking pin structure 82 is secured between the abutting structure 78 and the seat back locking member 80. Therefore, when the linear actuator releasing member 84 is placed in the unlocked position and the extension member 76 is freed to move forward or rearward, the back support locking pin structure 82, which is secured between the abutting structure 78 and the pivotally mounted seat back locking member 80, follows forward or rearward, thereby adjusting the position of the seat back cushion assembly 8. The operator's use of the linear actuator releasing member 84 to effect an adjustment of the degree of forward or rearward recline of the seat back has no effect on the position of the track assemblies 14.

As shown in FIG. 2, the seat back releasing member 22 is pivotally mounted to and extends rearwardly generally parallel to the first movable track assembly 60. As best shown in FIGS. 4, 5, 9 and 10, a seat back releasing member slot 86 is defined in the lower middle portion of the seat back releasing member 22 and slidably receives therein a seat back locking member contact structure 88 which projects from the lower portion of the seat back locking member 80. The releasing member slot 86 and the locking member contact structure 88 are configured such that upon upward rotational movement of the seat back releasing member 22 by an operator, the locking member contact structure 88 will be urged in a rearward direction by interaction with the releasing member slot 86, and as a result of the pivotal mounting of the seat back locking member 80 to the abutting structure 78, the seat back locking member 80 will pivot upward against the spring bias to the open position, thereby releasing the seat back locking pin structure 82. Upon such release, the seat back locking pin structure 82 and the fixedly attached lower portion of the seat back support member 16 will be free to pivotally rotate rearwardly about the seat back support pivot member 25, thereby allowing the seat back cushion assembly 8 to pivoted forwardly. Forward rotation of the seat back locking pin structure 82 is still prohibited by the position of the abutting structure 78.

As the seat back cushion assembly 8 rotates forwardly, the abutting structure 78 remains in its last position prior to movement of the seat back support member 16. By remaining in its last position, the abutting structure 78 maintains a memory of the last position of the seat back support member 16 and the seat back cushion assembly 8 prior to actuation of the seat back releasing member 22. Upon actuation of the seat back releasing member 22, the operation transmission member 26, being pivotally mounted to the lower portion of the seat back support member 16, will be pulled rearwardly as the seat back cushion assembly 8 is moved forwardly.

Upon return of the seat back cushion assembly 8 and the attached seat back support members 16 to the original position, the seat back locking pin structure 82 will initially strike against the rearward surface of the spring biased seat back locking member 80. As best shown in FIGS. 4–5 and 9–10, the rearward surface of the seat back locking member 80 is configured such as to allow the seat back locking pin structure 82 to urge the seat back locking member 80 against the spring bias until the locking pin structure 82 reaches the point where it is recaptured between the seat back locking member 80 and the abutting structure 78. Because the abutting structure 78 was maintained in its original position by the linear actuator support member 24, the seat back support structures 16 and the attached seat back cushion assembly 8 are, by the memory feature of the invention, held in the same position as they were prior to the actuation of the seat back releasing member 22. The linear actuator releasing member 84, when used by the operator to change the degree of erectness or recline of the seat back cushion assembly 8, also serves to reset the memory feature of the invention by repositioning the abutting structure 78.

As shown in FIGS. 2, 7 and 8, the pivotally mounted operation linking member 28 will be rotated by the rearward motion of the pivotally connected operation transmission member 26 in such a manner as to cause downward rotation of the integral rotating contact structure 29. The rotating contact structure 29 when rotated downward abuts against the outer plate link abutment surface 68 forcing the outer plate member 66 and the fixedly attached lock release coordinating structure 30 downward. The spring biased plate member 50 follows downward as a result of interaction through its plate member slot 56 with the coordinating member projection 58. Downward rotational movement of the end portion of the coordinating member 30 at the first movable track assembly 60 is transmitted across to the second movable track assembly 62 and is thus simultaneously accomplished at both movable track assemblies 34. Simultaneous downward motion of both spring biased plate members 50 results in the downward motion of the respective integral track locking members 48. The track locking members 48 are thus released from an interlocking engagement with the guide portions 38 of the fixed track assemblies 32, thereby allowing movement of the movable track assemblies 34. Conventionally, the seat cushion mounting assembly 6 provides a spring bias for the movable track assemblies 34 to move forward when the movable track assembly is unrestrained. Thus, by operating the seat back releasing member 22, the seat back cushion assembly 8 has been freed to pivotally rotate forwardly in an overlying relation to the seat cushion assembly 2 while simultaneously freeing the movable track assemblies 34 in a coordinated fashion such that the seat can be moved forward to provide greater ease of access to a rear seat passenger area.

Importantly, although a downward push against the link abutment surface 68 from the rotating contact structure 29 will effect the release of the movable track assembly 34, there is no direct linkage between the rotating contact structure 29 and the link abutment surface 68 of the outer plate member 66. When an operator selectively pulls upward on the lock release coordinating structure 30, the outer plate member 66 and its link abutment surface 68 move downward to release the movable track assemblies 34 from the fixed track assemblies 32. However, because there is no direct linkage between the link abutment surface 68 and the rotating contact structure 29, there is no responsive movement of the rotating contact structure 29. Thus, the release of the movable track assembly 34, when effected by an operator selectively using the lock release coordinating structure 30, does not result in any release or adjustment to the degree of recline of the seat back cushion assembly 8.

Figure 4:
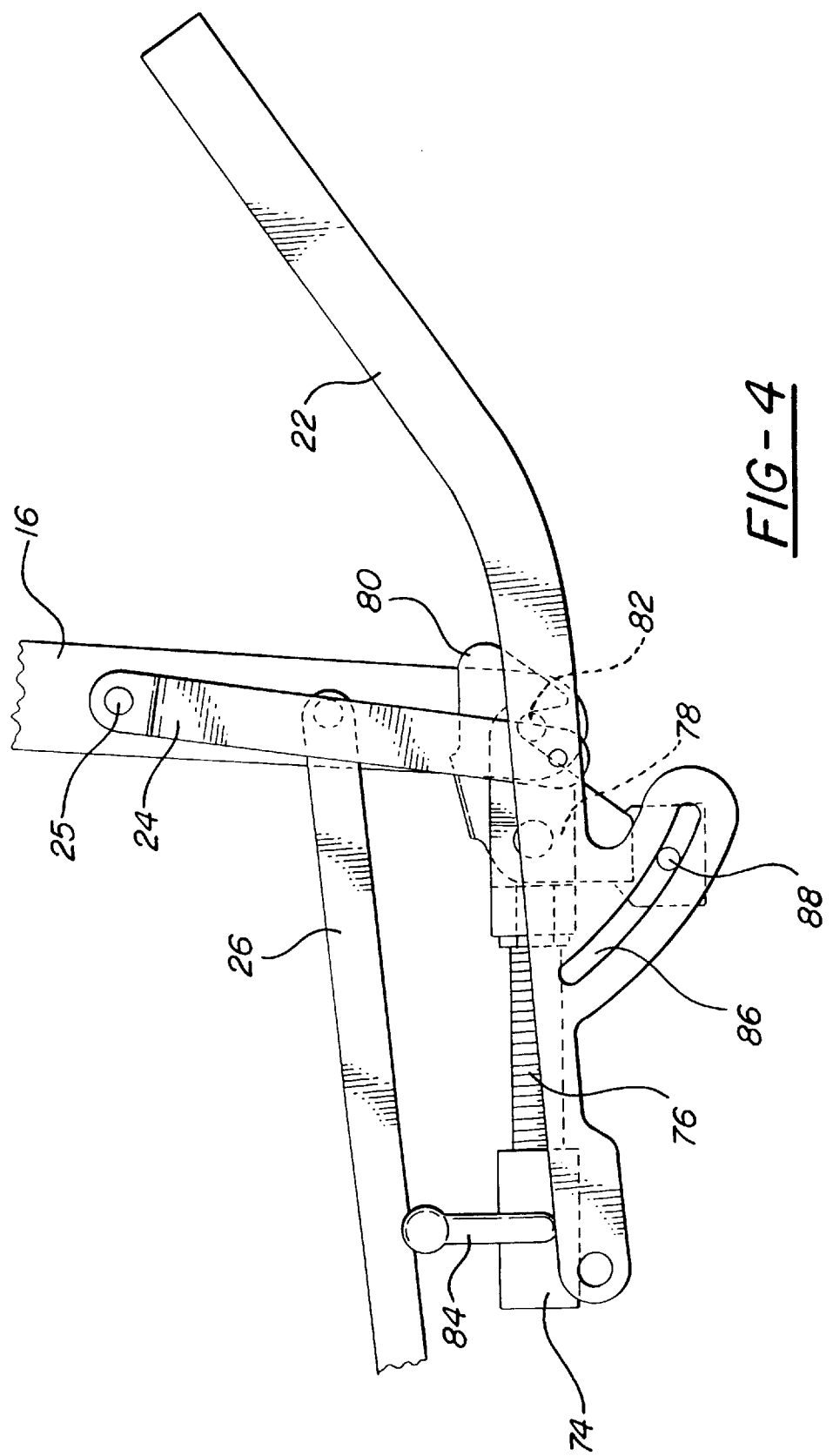
FIG. 4 is a fragmentary left side profile view of the latching assembly of a vehicle seat with a linear reclining mechanism and an easy entry latch with memory embodying the principles of the present invention as configured in the normal generally erect position.
Figure 5:
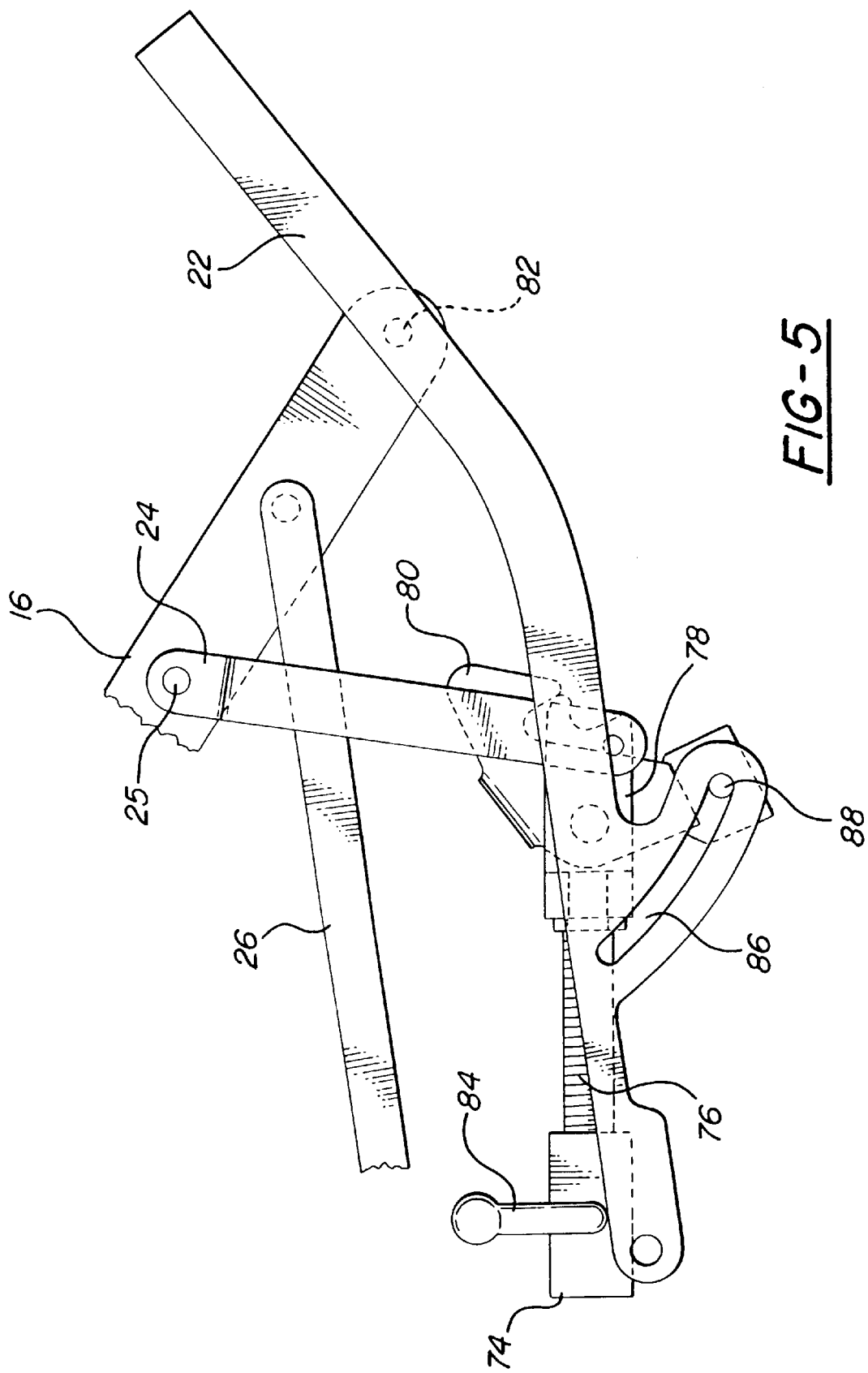
FIG. 5 is a view similar to FIG. 4 showing the position of the latching assembly components after the seat back actuating mechanism has been moved into the operative position.
Figure 6:
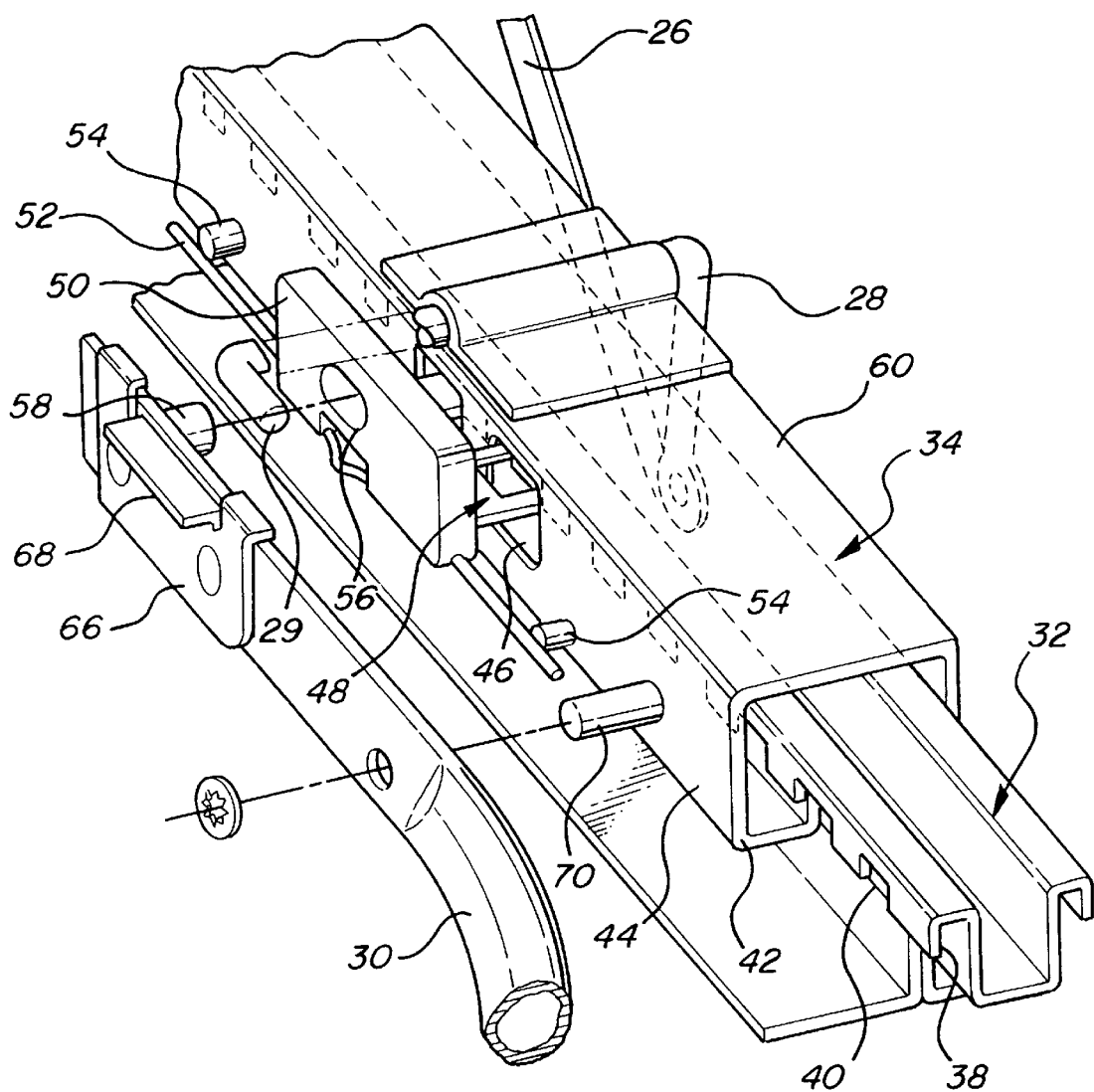
FIG. 6 is an exploded fragmentary perspective view of the track structure lock releasing mechanism of a vehicle seat with a linear reclining mechanism and an easy entry latch memory embodying the principles of the present invention.

The memory feature of the invention is most clearly demonstrated by comparison of FIGS. 4, 5, 9 and 10. The operation of the control assembly 23 upon movement of the seat back cushion assembly 8 from the normal generally erect position to the forward dump position, as shown in FIGS. 4 and 5, when compared to the operation of the control assembly 12 when the operation is initiated from the generally reclined position to the forward dump position, as shown in FIGS. 9 and 10, clearly shows that the linear actuator assembly 20, in conjunction with the linear actuator assembly support member 24, provides a memory feature of the invention by retaining the abutting structure 78 in previously adjusted position when the seat back cushion assembly 8 is pivoted rearwardly from the forward dump position. Upon return of the seat back support members 16 to a locked position the degree of seat back recline or erectness as earlier selected by operation of the linear actuator releasing member 84 will be preserved.

The invention thus allows operation of the lock release coordinating structure 30 and release of the movable track assemblies 34 without effect on the selected and locked recline position of the seat back cushion assembly 8. Further, upon operation of the seat back releasing member 22, the invention provides a coordinated dual action release of the seat back support members 16 and the movable track assemblies 34. Throughout this dual action operation of the invention, the linear actuator assembly 20 is retained in the last selected position by the memory feature of the invention such that upon returning the seat back to a generally erect or reclined position, the seat back locking pin structure 82 will be recaptured in the same location from which it was earlier released without further adjustment.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced otherwise than as specifically described.

What is claimed is:

1. A vehicle seat assembly including:
   a seat mounting assembly for securing said seat assembly in a vehicle;
   a seat cushion supported by said seat mounting assembly;
   a seat back pivotally secured to said seat mounting assembly and pivotal between one of a plurality of reclining positions and a forward dumping position;
   a linear actuator for selectively adjusting said seat back between said plurality of reclining positions and defining an adjusted reclining position said linear actuator including an elongated extension member terminating in an abutting structure for engaging and pivoting said seat back between said reclining positions;
   a locking member intercoupled between said linear actuator and said seat back for operatively locking said seat back in said adjusted reclining position, said locking member pivotally mounted to said abutting structure for selective rotation between an open position and a closed position; and
   a seat back releasing member coupled to said locking member for rotating said locking member from said closed position, engaging and retaining said seat back in said adjusted reclining position, to said open position, disengaged from said seat back to allow said seat back to pivot to said dumping position whereby said adjusted reclining position of said seat back is maintained by said linear actuator.

2. A vehicle seat assembly as set forth in claim 1 wherein said releasing member has a slot and said locking member is coupled to said slot for providing a lost motion connection between said locking member and said releasing member whereby said releasing member and said seat cushion maintain a substantially constant position relative to each other.

3. A vehicle seat assembly as set forth in claim 2 further including a linear actuator support structure having a first end pivotally connected to said seat back and a second end pivotally connected to said linear actuator for supporting and guiding said seat back between said plurality of reclining positions and said dumping position.

4. A vehicle seat assembly as set forth in claim 3 further including a seat back support member for pivotally connecting said seat back and said first end of said linear actuator support structure to said seat mounting assembly.

5. A vehicle seat assembly as set forth in claim 4 wherein said seat back releasing member includes a first end pivotally connected to said seat mounting assembly, a second distal end for actuating said releasing member and a middle portion therebetween coupled to said seat back locking member for pivoting said locking member between a locked position engaging and retaining said seat back in said reclining position and an unlocked position releasing said seat back for movement to said dumping position.

6. A vehicle seat assembly as set forth in claim 5 wherein said slot has a substantially arcuate configuration and is integrally disposed within said middle portion of said releasing member.

7. A vehicle seat assembly as set forth in claim 6 wherein said locking member includes a contact structure engaging said arcuate slot of said release member for interconnecting said locking member to said release member.

8. A vehicle seat assembly as set forth in claim 7 wherein said linear actuator further includes a linear actuator releasing member and an elongated extension member extending between said releasing member and said abutting structure for linearly translating said abutting structure to adjust said seat back to one of said plurality of reclining positions.

9. A vehicle seat assembly as set forth in claim 8 wherein said seat mounting assembly includes a track assembly for providing fore and aft sliding movement of said seat.

10. A vehicle seat assembly as set forth in claim 9 wherein said track assembly includes a pair of fixed track members for securing said seat assembly to the vehicle and a pair of moveable track members slidably coupled to said respective fixed track members for providing said fore and aft seat movement.

11. A vehicle seat assembly as set forth in claim 10 wherein said track assembly further includes a track locking member for interlocking said fixed and said moveable track members in one of a plurality of fore and aft adjusted positions.

12. A vehicle seat assembly as set forth in claim 11 wherein said track assembly further. includes a track lock release member for selectively locking and unlocking said fixed and moveable track members in said fore and aft adjusted position.

13. A vehicle seat assembly as set forth in claim 11 further including a transmission member extending between said seat back and said track locking member for unlocking said track locking member in response to pivotal movement of said seat back from said adjusted reclining position to said dumping position.

14. A linear reclining mechanism adapted for use with a vehicle seat including:

a linear actuator for selectively adjusting the seat between a plurality of reclining positions and defining an adjusted reclining position, said linear actuator including an elongated extension member terminating in an abutting structure for engaging and pivoting the seat between said reclining positions;

a locking member intercoupled with the linear actuator and the seat for operatively locking the seat in said adjusted reclining position, said locking member pivotally mounted to said abutting structure for selective rotation between an open position and a closed position; and a releasing member coupled to said locking member for rotating said locking member from said closed position, engaging and retaining said seat back in said adjusted reclining position, to said open position, disengaged from said seat back, to allow the seat to pivot to a dumping position whereby said adjusted reclining position of the seat is maintained by said linear actuator.

15. A linear reclining mechanism as set forth in claim 14 wherein said releasing member has a slot and said locking member is coupled to said slot for providing a lost motion connection between said locking member and said releasing member whereby said releasing member and said seat cushion maintain a substantially constant position relative to each other.

16. A linear reclining mechanism as set forth in claim 15 wherein said releasing member includes a first end, a second distal end for actuating said releasing member and a middle portion therebetween coupled to said locking member for pivoting said locking member between a lock position when the seat is in said reclining position and an unlocked position releasing said locking member for movement of the seat to said dumping position.

17. A linear reclining mechanism as set forth in claim 16 wherein said slot has a substantially arcuate configuration and is integrally disposed within said middle portion of said releasing member.

18. A linear reclining mechanism as set forth in claim 17 wherein said locking member includes a contact structure engaging said arcuate slot of said release member for interconnecting said locking member to said release member.

19. A linear reclining mechanism as set forth in claim 18 wherein said linear actuator further includes a linear actuator releasing member and an elongated extension member extending between said releasing member and said abutting structure for linearly translating said abutting structure to one of said reclining positions.

20. A mounting assembly adapted for securing and adjusting a seat in a vehicle, said mounting assembly including:

a track assembly having a pair of fixed track members for securing the seat to the vehicle and a pair of moveable track members slidably coupled to said respective fixed track members for providing for and aft movement to selectively adjust the seat between a plurality of reclining positions and a dumping position;

a linear actuator secured to said track assembly for selectively adjusting the seat between said plurality of reclining positions and defining an adjusted reclining position, said linear actuator including an elongated extension member terminating in an abutting structure for engaging and pivoting the seat between said reclining positions;

a locking member intercoupled between said linear actuator and the seat for operatively locking the seat in said adjusted reclining position, said locking member pivotally mounted to said abutting structure for selective rotation between an open position and a closed position; and a releasing member coupled to said locking member for rotating said locking member from said closed position, engaging and retaining the seat in said adjusted reclining position, to said open position, disengaged from the seat, to allow the seat to pivot to said dumping position whereby said adjusted reclining position of the seat is maintained by said linear actuator.

21. A mounting assembly as set forth in claim 20 further including a track locking member for interlocking said fixed and moveable track members in one of a pivotally of fore and aft adjusted positions.

22. A mounting assembly as set forth in claim 21 further including a linear actuator support structure having a first end for attachment to the seat and a second end pivotally connected to said linear actuator for supporting and guiding the seat between said plurality of reclining positions and said dumping positions.

23. A mounting assembly as set forth in claim 22 further including a transmission member extending between said support structure and said track locking member for unlocking said track locking member in response to pivotal movement of the seat from said adjusted reclining position to said dumping position.

24. A mounting assembly as set forth in claim 23 wherein said releasing member has a slot and said locking member is coupled to said slot for providing a lost motion connection between said locking member and said releasing member whereby said releasing member and the seat maintain a substantially constant position relative to each other.

* * * * *